United States Patent
Wu et al.

(10) Patent No.: US 7,522,250 B2
(45) Date of Patent: Apr. 21, 2009

(54) LIQUID CRYSTAL PANEL HAVING TWO DIFFERENT SPACERS IN SEALANT

(75) Inventors: Jia-Yi Wu, Miao-Li (TW); Kun-Hsin Hsiao, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 88 days.

(21) Appl. No.: 11/641,341

(22) Filed: Dec. 18, 2006

(65) Prior Publication Data

US 2007/0139601 A1 Jun. 21, 2007

(30) Foreign Application Priority Data

Dec. 16, 2005 (TW) .............................. 94144817 A

(51) Int. Cl.
*G02F 1/1339* (2006.01)

(52) U.S. Cl. ....................................... 349/153; 349/190

(58) Field of Classification Search ......... 349/153–154, 349/155–156, 190
See application file for complete search history.

(56) References Cited

U.S. PATENT DOCUMENTS

| 6,392,735 | B1 * | 5/2002 | Tani ............................ 349/156 |
| 6,466,294 | B1 * | 10/2002 | Yamagishi et al. .......... 349/155 |
| 6,486,936 | B1 * | 11/2002 | Sugimoto ................... 349/155 |
| 6,822,725 | B2 | 11/2004 | Choo et al. |
| 2001/0013919 | A1 * | 8/2001 | Sato et al. ................... 349/153 |

* cited by examiner

*Primary Examiner*—Dung T. Nguyen
(74) *Attorney, Agent, or Firm*—Wei Te Chung

(57) ABSTRACT

An exemplary liquid crystal panel (20) includes a first and a second substrates (21, 22), opposite to each other; a liquid crystal layer (23) sandwich between the first and the second substrates; and a sealant (24) sandwiched between the peripheral region of the first and the second substrates, for adhering the first and the second substrates. The sealant has a plurality of first spacers (25) and a plurality of second spacers (26) different from the first spacers.

5 Claims, 2 Drawing Sheets

LIQUID CRYSTAL PANEL HAVING TWO DIFFERENT SPACERS IN SEALANT

FIELD OF THE INVENTION

The present invention relates to liquid crystal panels, and in particular to a liquid crystal panel having two different spacers in a sealant thereof.

GENERAL BACKGROUND

Because liquid crystal displays have the merits of being thin, light in weight, and drivable by a low voltage, they are extensively employed in various electronic devices.

Referring to FIG. 5, a typical liquid crystal panel 10 has a first substrate 11, a second substrate 12 opposite to the first substrate 11, a sealant 14 formed at a peripheral region of the liquid crystal panel 10 between the first and second substrates 11, 12, a liquid crystal layer 13 contained in a space defined by the first and second substrates 11, 12 and the sealant 14. The sealant 14 is used to adhere the first and the second substrates 11, 12, and surround and airproof the liquid crystal layer 13.

The sealant 14 contains a plurality of spacers 15, which are used to support the first and second substrates 11, 12 and thereby keep the distance (cell gap) between the first and second substrates 11, 12 uniform. The spacers 15 are incompressible rod spacers, which have a columnar configuration. A length of each spacer 15 is in the range from 10 to 100 micrometers, and a diameter of the spacer 15 is in the range from 2 to 10 micrometers.

However, an inner surface of one of the first and second substrates 11, 12 is formed with a plurality of wires, such as data lines or gate lines. Thus, the inner surface of the first substrate 11 or the second substrate 12 is uneven. When the first and second substrates 11, 12 are attached together, the sealant 14 may not be able to attain a uniform cell gap between the first and second substrates 11, 12, due to the uneven inner surface and the rigidity (lack of flexibility) of the spacers 15. Thus the liquid crystal layer 13 has different thicknesses over a whole expanse of the liquid crystal panel 10, and the display quality of the liquid crystal panel 10 may be inconsistent or otherwise impaired.

What is needed, therefore, is a liquid crystal display that can overcome the above-described deficiencies.

SUMMARY

In a preferred embodiment, a liquid crystal panel includes a first and a second substrates, opposite to each other; a liquid crystal layer sandwich between the first and the second substrates; and a sealant sandwiched between the peripheral region of the first and the second substrates, for adhering the first and the second substrates. The sealant has a plurality of first spacers and a plurality of second spacers different from the first spacers.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
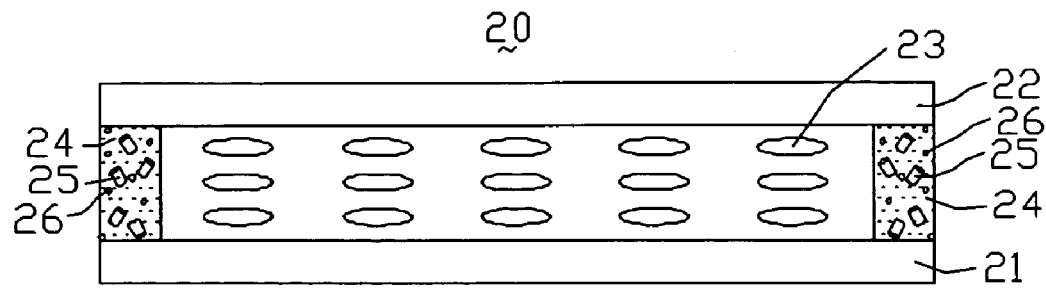
FIG. 1 is a side cross-sectional view of a liquid crystal panel according to a first embodiment of the present invention.

Referring to FIG. 1, a liquid crystal panel 20 according to a first embodiment of the present invention is shown. The liquid crystal panel 20 has a first substrate 21, a second substrate 22 opposite to the first substrate 21, a sealant 24 formed at a peripheral region of the liquid crystal panel 20 between the first and second substrates 21, 22, and a liquid crystal layer 23 contained in a space defined by the first and the second substrates 21, 22 and the sealant 24. The sealant 24 is used to adhere the first and second substrates 21, 22 together, and surround and airproof the liquid crystal layer 23.

The sealant 24 has a plurality of first spacers 25, and a plurality of second spacers 26 different from the first spacers 25. The first and second spacers 25, 26 are used to support the first and second substrates 21, 22, and keep a distance between the first and the second substrates 21, 22 at the peripheral region of the liquid crystal panel 20 uniform.

The first spacers 25 are rod spacers, which have a columnar shape. A length of each first spacer 25 is in the range from 10 to 100 micrometers, and a diameter of the first spacer 25 is in the range from 2 to 10 micrometers. The second spacers 26 are silica spacers, which are spherical. A diameter of each second spacer 26 is in the range from 2 to 10 micrometers. The first and the second spacers 25, 26 are incompressible spacers.

When the first and second substrates 21, 22 are attached together, because the first and second spacers 25, 26 are differently sized and differently shaped, the first and second spacers 25, 26 can cooperatively adapt to any uneven inner surface of the first and/or second substrates 21, 22. That is, the first and second spacers 25, 26 can attain a consistent distance between the first and second substrates 21, 22, so that the liquid crystal layer 23 has a uniform thickness. Thus the liquid crystal panel 20 can provide consistent, good display quality.

Figure 2:
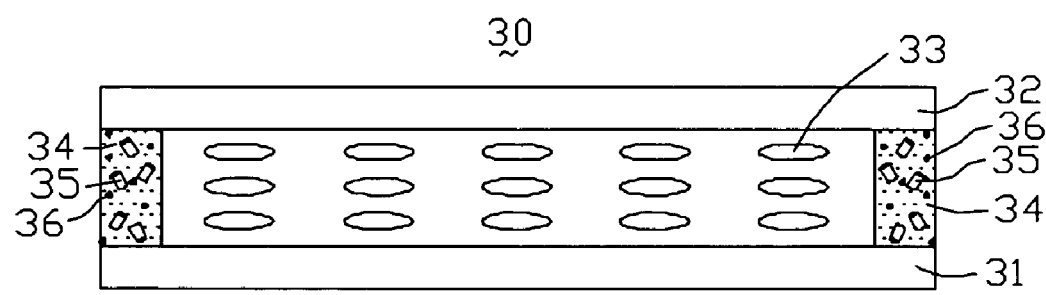
FIG. 2 is a side cross-sectional view of a liquid crystal panel according to a second embodiment of the present invention.

Referring to FIG. 2, a liquid crystal panel 30 according to a second embodiment of the present invention is shown. The liquid crystal panel 30 has a first substrate 31, a second substrate 32 opposite to the first substrate 31, a sealant 34 formed at a peripheral region of the liquid crystal panel 30 between the first and second substrates 31, 32, and a liquid crystal layer 33 contained in a space defined by the first and second substrates 31, 32 and the sealant 34. The sealant 34 is used to adhere the first and second substrates 31, 32 together, and surround and airproof the liquid crystal layer 33.

The sealant 34 has a plurality of first spacers 35, and a plurality of second spacers 36 different from the first spacers 35. The first and second spacers 35, 36 are used to support the first and second substrates 31, 32, and keep a distance between the first and second substrates 31, 32 at the peripheral region of the liquid crystal panel 30 uniform.

The first spacers 35 are rod spacers, which have a columnar shape. A length of each first spacer 35 is in the range from 10 to 100 micrometers, and a diameter of the first spacer 35 is in the range from 2 to 10 micrometers. The second spacers 26 are plastic spacers, which are spherical. A diameter of each second spacer 26 is in the range from 2 to 10 micrometers. The first spacers 35 are incompressible spacers, and the second spacers 36 are compressible spacers.

When the first and second substrates 31, 32 are attached together, the two different spacers 35, 36 can cooperatively adapt to any uneven inner surface of the first and/or second substrate 31, 32. That is, the first and second spacers 35, 36 can attain a consistent distance between the first and second substrates 31, 32, so that the liquid crystal layer 33 has a uniform thickness. Thus the liquid crystal panel 30 can provide consistent, good display quality.

Figure 3:
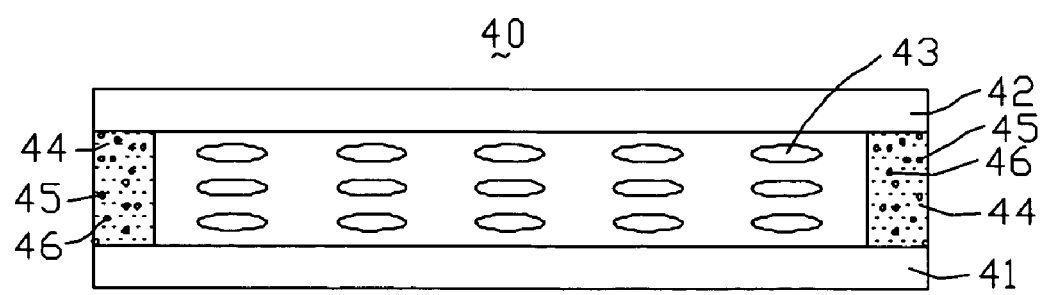
FIG. 3 is a side cross-sectional view of a liquid crystal panel according to a third embodiment of the present invention.

Referring to FIG. 3, a liquid crystal panel 40 according to a third embodiment of the present invention is shown. The liquid crystal panel 40 has a first substrate 41, a second substrate 42 opposite to the first substrate 41, a sealant 44 formed at a peripheral region of the liquid crystal panel 40 between the first and second substrates 41, 42, and a liquid crystal layer 43 contained in a space defined by the first and second substrates 41, 42 and the sealant 44. The sealant 44 is used to adhere the first and second substrates 41, 42 together, and surround and airproof the liquid crystal layer 43.

The sealant 44 has a plurality of first spacers 45, and a plurality of second spacers 46 different from the first spacers 45. The first and second spacers 45, 46 are used to support the first and second substrates 41, 42, and keep a distance between the first and second substrates 41, 42 at the peripheral region of the liquid crystal panel 40 uniform.

The first spacers 45 are silica spacers, which are spherical. A diameter of each first spacer 45 is in the range from 2 to 10 micrometers. The second spacers 46 are plastic spacers, which are spherical. A diameter of each second spacer 46 is in the range from 2 to 10 micrometers. The first spacers 45 are incompressible spacers, and the second spacers 36 are compressible spacers.

When the first and second substrates 41, 42 are attached together, the two different spacers 45, 46 can cooperatively adapt to any uneven inner surface of the first and/or second substrates 41, 42. That is, the first and second spacers 35, 36 can attain a consistent distance between the first and the second substrates 41, 42, so that the liquid crystal layer 43 has a uniform thickness. Thus the liquid crystal panel 40 can provide consistent, good display quality.

Figure 4:
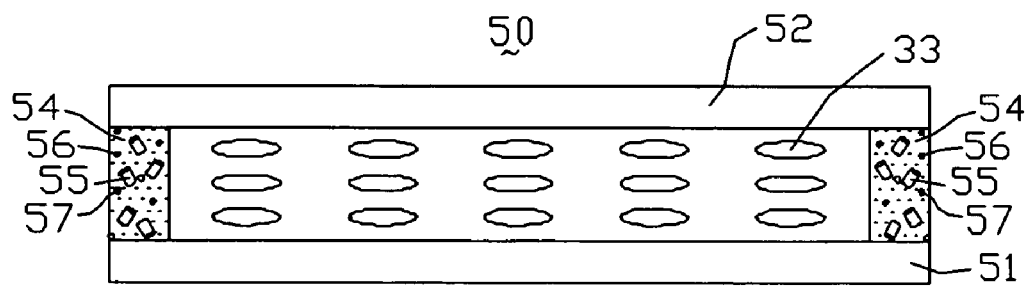
FIG. 4 is a side cross-sectional view of a liquid crystal panel according to a fourth embodiment of the present invention.
Figure 5:
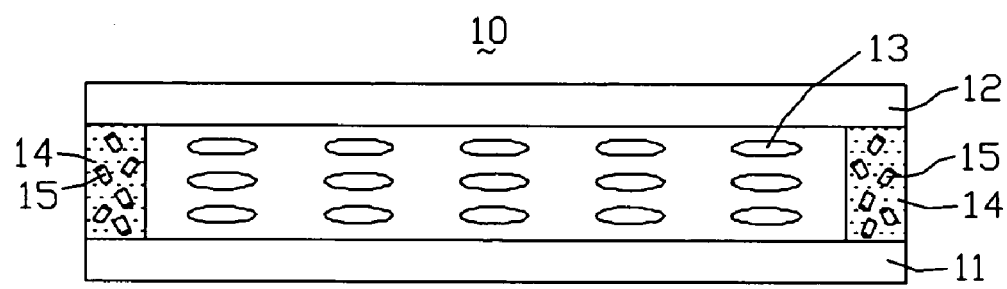
FIG. 5 is a side cross-sectional view of a conventional liquid crystal panel.

Referring to FIG. 4, a liquid crystal panel 50 according to a third embodiment of the present invention is shown. The liquid crystal panel 50 has a first substrate 51, a second substrate 52 opposite to the first substrate 51, a sealant 54 formed at a peripheral region of the liquid crystal panel 50 between the first and second substrates 51, 52, and a liquid crystal layer 53 contained in a space defined by the first and second substrates 51, 52 and the sealant 54. The sealant 54 is used to adhere the first and second substrates 51, 52 together, and surround and airproof the liquid crystal layer 53.

The sealant 54 has a plurality of first spacers 55, a plurality of second spacers 56 which different from the first spacers 55, and a plurality of third spacers 57 which are different from both the first and second spacers 55, 56. The first, second and third spacers 55, 56, 57 are used to support the first and second substrates 51, 52, and keep a distance between the first and second substrates 51, 52 at the peripheral region of the liquid crystal panel 50 uniform.

The first spacers 55 are rod spacers, which have a columnar shape. A length of each first spacer 55 is in the range from 10 to 100 micrometers, and a diameter of the first spacer 55 is in the range from 2 to 10 micrometers. The second spacers 56 are silica spacers, which are spherical. A diameter of each second spacer 56 is in the range from 2 to 10 micrometers. The third spacers 57 are plastic spacers, which are spherical. A diameter of each third spacer 57 is in the range from 2 to 10 micrometers. The first and second spacers 55, 56 are incompressible spacers, and the second spacers 57 are compressible spacers.

When the first and second substrates 51, 52 are attached together, the three different spacers 55, 56, 57 can cooperatively adapt to any uneven inner surface of the first and/or second substrates 51, 52. That is, the first, second and third spacers 55, 56, 57 can attain a consistent distance between the first and second substrates 51, 52, so that the liquid crystal layer 53 has a uniform thickness. Thus the liquid crystal panel 50 can provide consistent, good display quality.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal panel, comprising:
a first substrate and a second substrate, which are opposite to each other;
a liquid crystal layer sandwiched between the first and second substrates; and
a sealant provided at a peripheral region of the liquid crystal panel and sandwiched between the first and second substrates, the sealant adhering the first and the second substrates together;
wherein the sealant comprises a plurality of first spacers and a plurality of second spacers different from the first spacers, a plurality of third spacers different from both the first and second spacers, doped therein, which the first and the second spacers are incompressible and the third spacers is compressible.

2. The liquid crystal panel as claimed in claim 1, wherein the third spacers are sphere shaped, have a diameter of 2 to 10 micrometers.

3. The liquid crystal panel as claimed in claim 2, wherein the third spacers are plastic spacers.

4. The liquid crystal panel as claimed in claim 1, wherein the first and the second spacers are sphere shaped, having a diameter of 2 to 10 micrometers.

5. The liquid crystal panel as claimed in claim 4, wherein the first spacers are silica spacers, and the second spacers are plastic spacers.

* * * * *